(12) United States Patent
Uhrick et al.

(10) Patent No.: US 11,041,672 B2
(45) Date of Patent: Jun. 22, 2021

(54) INTEGRATED HVAC EVAPORATOR SEAL

(71) Applicant: DENSO International America, Inc., Southfield, MI (US)

(72) Inventors: John M. Uhrick, Royal Oak, MI (US); Chariton Klavin, Canton, MI (US)

(73) Assignee: Denso International America, Inc., Southfield, MI (US)

( * ) Notice: Subject to any disclaimer, the term of this patent is extended or adjusted under 35 U.S.C. 154(b) by 122 days.

(21) Appl. No.: 16/285,403

(22) Filed: Feb. 26, 2019

(65) Prior Publication Data
US 2020/0271375 A1    Aug. 27, 2020

(51) Int. Cl.
*F25D 23/08* (2006.01)
*F25B 39/02* (2006.01)

(52) U.S. Cl.
CPC .............. *F25D 23/08* (2013.01); *F25B 39/02* (2013.01)

(58) Field of Classification Search
CPC . F25B 39/02; B60H 1/00528; B60H 1/00521; B60H 1/00028; B60H 2001/00635; B60H 2001/00107; F25D 23/08
See application file for complete search history.

(56) References Cited

U.S. PATENT DOCUMENTS

2006/0053813 A1\* 3/2006 Tahara ............... B60H 1/00028
62/239
2019/0092124 A1\* 3/2019 Ferrer ....................... F16L 5/02

FOREIGN PATENT DOCUMENTS

| DE | 102016203871 A1 | 9/2017 |
| DE | 102016118793 A1 | 4/2018 |
| FR | 2879169 B1 | 10/2009 |

\* cited by examiner

*Primary Examiner* — Elizabeth J Martin
(74) *Attorney, Agent, or Firm* — Brooks Kushman, P.C.

(57) ABSTRACT

An HVAC assembly including a base portion that includes a rib outwardly extending therefrom. The base portion and the rib formed of a first material having a first elongation to yield. The blower housing including a collapsible portion that is formed of a second material and fixed to the rib by a bond between the first and second materials. The second material having an elongation to yield that is greater than the first elongation to yield of the first material and is configured to collapse when a force is applied to the collapsible portion.

20 Claims, 5 Drawing Sheets

US 11,041,672 B2

INTEGRATED HVAC EVAPORATOR SEAL

TECHNICAL FIELD

The present disclosure relates to a seal for vehicle heating ventilation air conditioning (HVAC) assemblies.

BACKGROUND

Vehicle HVAC assemblies generally include a housing comprised of a number of plastic members that house heat exchangers and various devices configured to direct air flow to heat and cool a vehicle cabin. As one example of a heat exchanger, the housing may contain an evaporator that turns a liquid form of one or more coolants into a gaseous or vapor form. The evaporator may be titled within the housing to guide condensate towards one or more drain channels.

SUMMARY

According to one embodiment, an HVAC assembly for a vehicle is provided. The HVAC assembly may include a base portion that includes a rib outwardly extending therefrom. The base portion and the rib may be formed of a first material having a first elongation to yield. The blower housing may also include a collapsible portion that is formed of a second material and fixed to the rib by a bond between the first and second materials. The second material may have an elongation to yield that is greater than the first elongation to yield of the first material and may be configured to collapse when a force is applied to the collapsible portion.

According to another embodiment, an HVAC system is provided. The HVAC system may include an evaporator and a lower blower assembly. The lower blower assembly may include a base portion and include a seal. The seal may include a rib and an elastic portion. The rib may be comprised of a first material and outwardly extend from the base portion. The elastic portion may be comprised of a second material and be connected to the rib by a bond. The collapsible portion may be configured to collapse when the evaporator is laid on the seal.

According to yet another embodiment, a method of producing an HVAC assembly is provided. The method may include injecting a first material in to a mold defining a cavity to form a lower blower housing that includes a base portion, a sidewall, and a rib each extending therefrom. The method may also include injecting a second material into the mold to form a collapsible seal bonded to the distal end of the elongated rib.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

An HVAC assembly or module may include an evaporator that may be disposed within a housing and arranged along an angle with respect to the housing. Positioning the evaporator along an angle may guide condensate towards drain channels within the housing. A seal may be provided between the evaporator and the housing to prevent condensate from leaking from the housing. A prior-art seal 16, illustrated in FIG. 4A, has been used to seal the joint formed between the evaporator and the housing. The prior-art seal 16 must be attached to or fixed to a bottom portion of the housing by hand and the evaporator must be within the housing and on top of the seal. For a number of reasons, a suitable seal between the housing and the evaporator may not be achieved. For example, the seal may be incorrectly attached due to human error during assembly. As another example, because the evaporator is laid on top of the seal, it is not possible for the operator to determine whether the seal maintains its position as the evaporator is assembled within the housing. This disclosure provides solutions to these problems.

Figure 1:
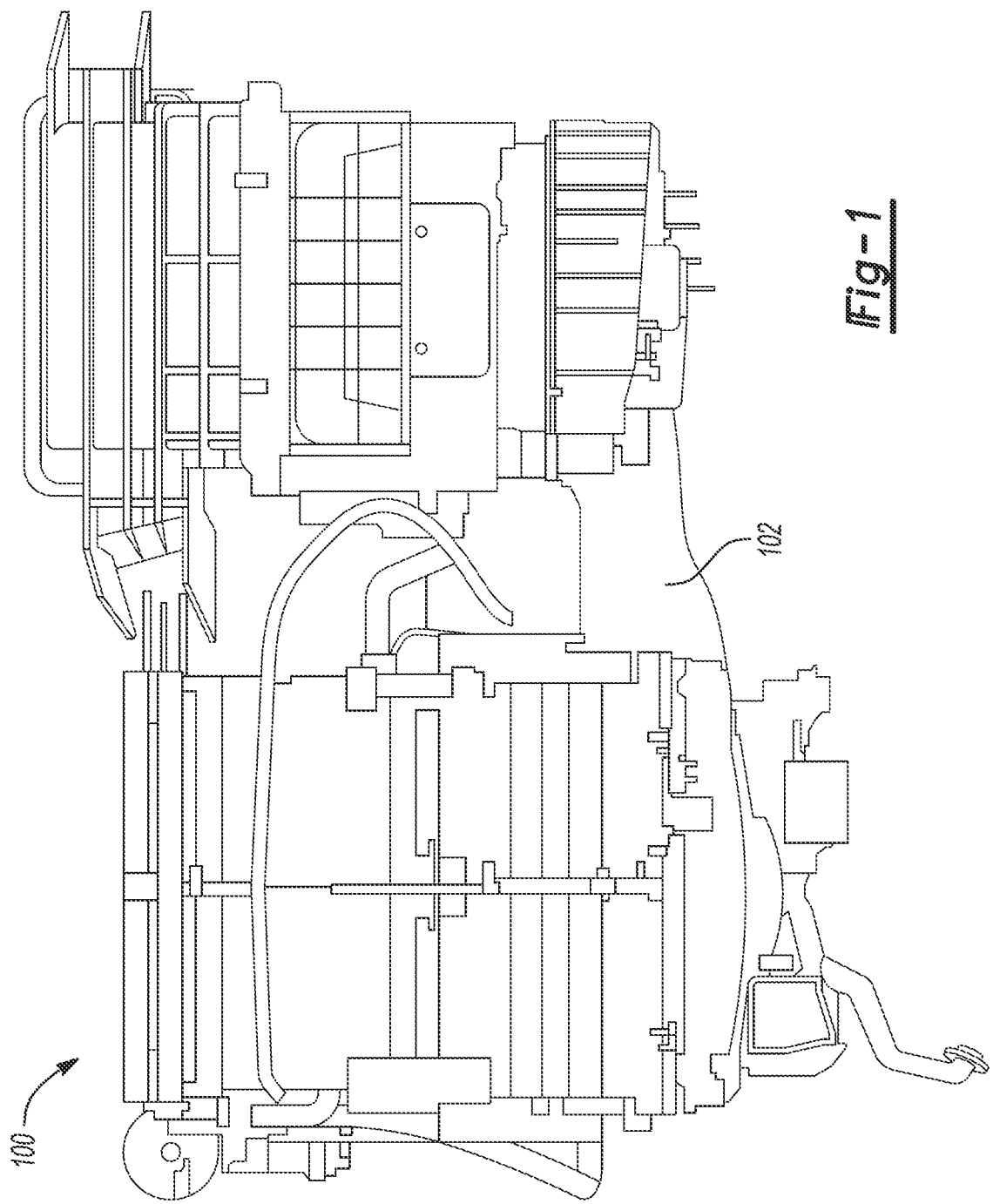
FIG. 1 is a front plan view of an exemplary HVAC assembly.

FIG. 1 illustrates an HVAC assembly 100 provided with a lower blower housing 102.

Figure 2:
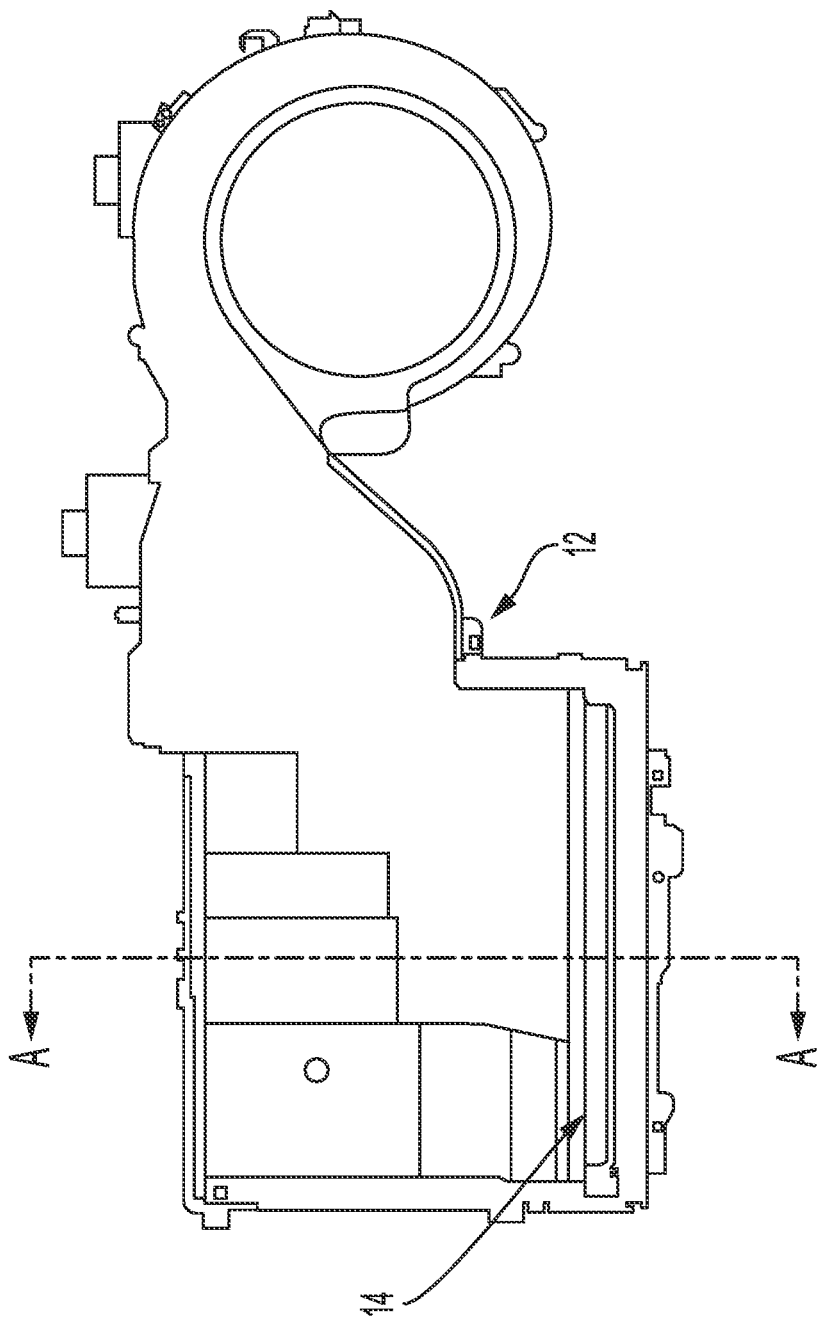
FIG. 2 is a top view of an exemplary lower blower housing of the HVAC assembly shown in FIG. 1.

FIG. 2 illustrates a top view of the prior-art lower blower housing 12. The prior art lower-blower housing 12 is provided with a rib that extends from a bottom surface of the lower-blower housing 12 across a portion of the housing 12.

Figure 3:
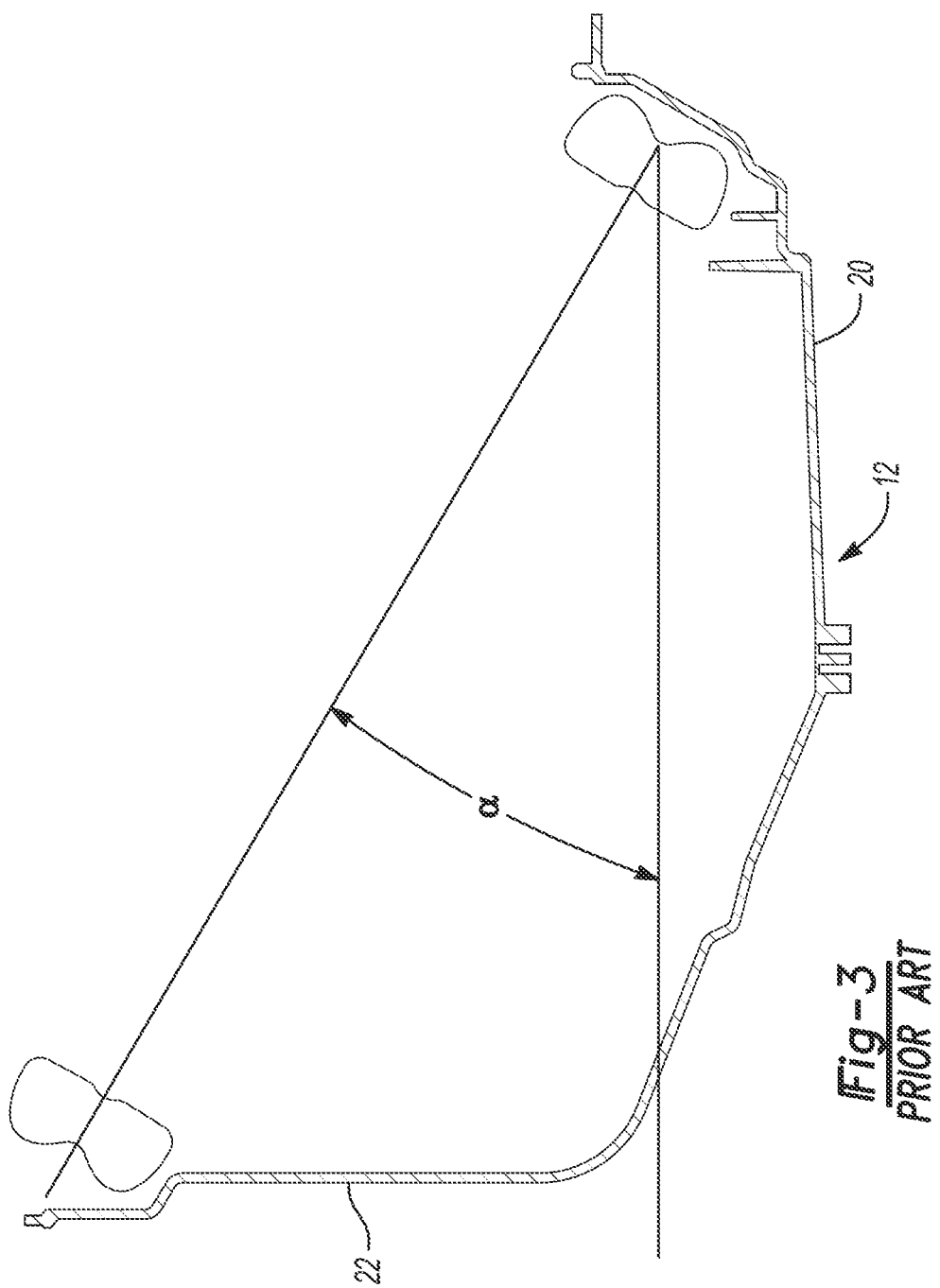
FIG. 3 is a cross-sectional view of the lower blower housing, an evaporator, and a prior-art seal disposed between the evaporator and the lower blower housing.

FIG. 3 illustrates a cross-sectional view of the prior-art lower-blower housing 12 and an evaporator 18 disposed therein. The lower-blower housing 12 includes a base portion 20 and sidewalls 22 that extend therefrom. As described above, the rib 14 extends from the base portion 20 in a direction that is orthogonal to the base portion 20. The prior-art seal 16 is shown assembled to the rib 14. When assembled, the evaporator 18 may be disposed along an angle α to engage the sidewalls 22 of the lower-blower housing 12. The prior-art seal 16 may be sandwiched between the evaporator 18 and the rib 14.

Figure 4:
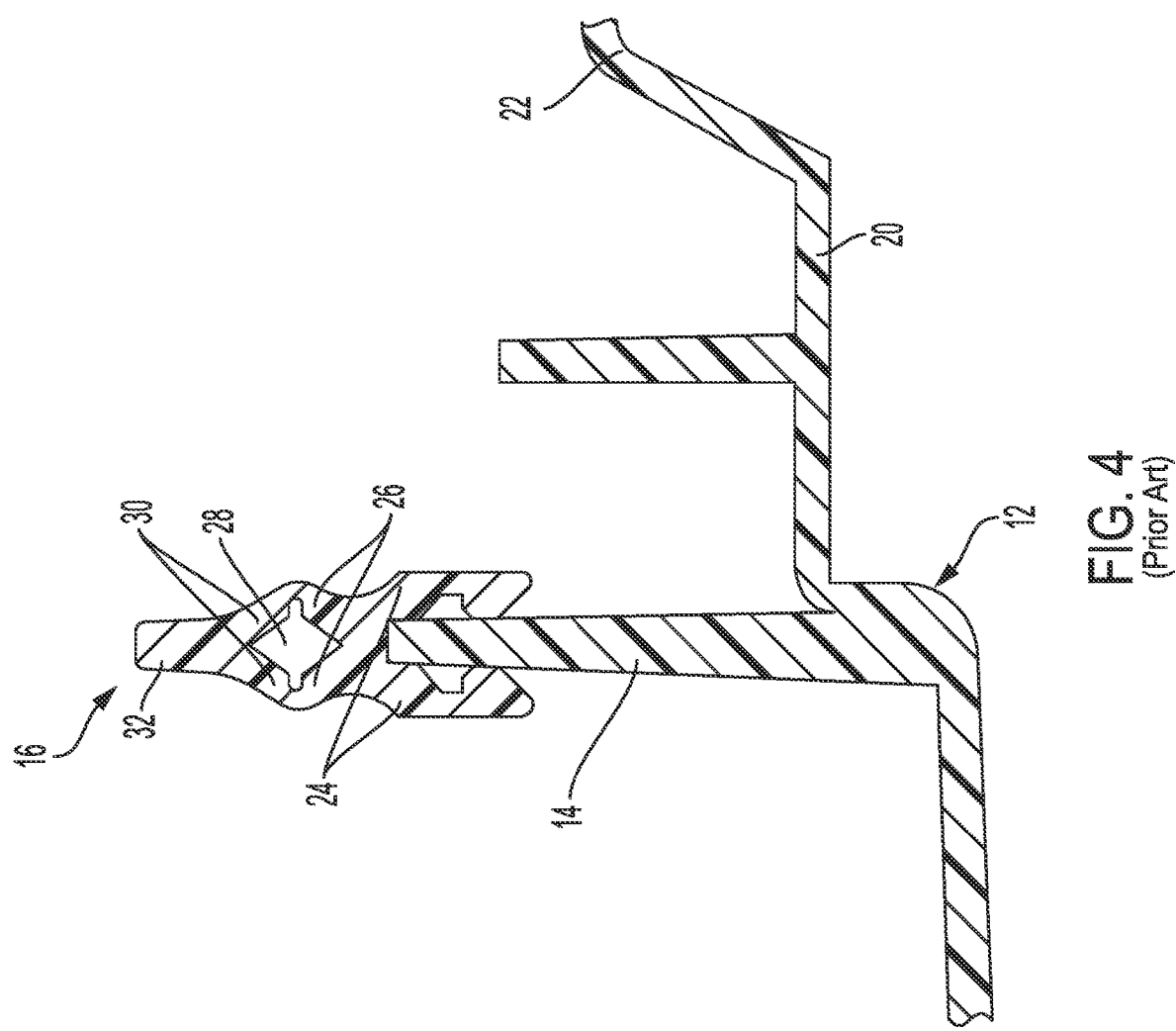
FIG. 4 is a cross sectional view of the prior art seal and the lower blower housing of FIG. 2.

FIG. 4 illustrates a detail cross-sectional view of the prior-art lower-blower housing 12 and prior-art seal 16. The rib 14, base portion 20, and the sidewall 22 of the prior-art lower-blower housing 12 is comprised of the same material. For example, the material may be polypropylene. The prior-art seal 16 may include a pair of clip arms 24 that may be opened to engage the rib 14 when the prior-art seal 16 is assembled to the prior-art lower-blower housing 12. A pair of lower legs 26 may extend from the clip arms 24 and a pair of upper legs 30 may extend from the pair of lower legs 26 to a distal end 32.

Figure 5:
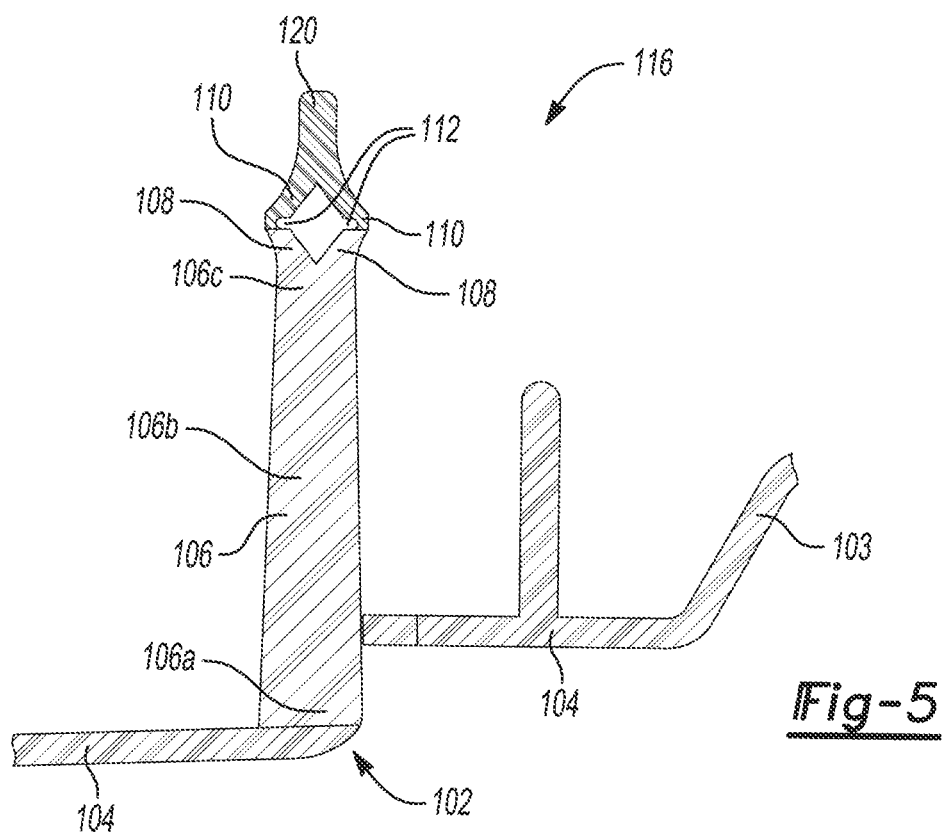
FIG. 5 is a cross sectional view of an exemplary lower blower housing and an integrated seal.

FIG. 5 illustrates a detail cross-sectional view of a lower-blower housing 102 provided with an integrated seal 116. The lower-blower housing 102 includes a base portion 104 and sidewalls 103 that extend therefrom. The base portion 104 and sidewalls 103 may be comprised of a plastic material such as, polypropylene. The integrated seal 116 may include a rib 106 that is comprised of a plastic or polymeric material, such as, polypropylene. The rib 106 may extend in a direction that is orthogonal to the base portion 104. The rib 106 may be tapered, so that a proximal end 106a connected to the base portion 104 has a wider cross-sectional area than a distal end 106c of the rib 106. The rib 106 may include a medial portion 106b that may extend between the proximal end 106a and the distal end 106c. The rib 106 may include a pair of lower legs 108 that form a V-shape towards an upper portion of the rib 106. In one or more embodiments, the rib 106 of the seal 116 may be comprised of the same material as the base portion 104 of the lower-blower housing 102.

The integrated seal 116 may also be provided with an elastic or collapsible portion. The collapsible portion, indicated by the different cross-hatching than the cross-hatching of the rib 106, is connected to the rib by a bond. The collapsible portion may include a pair of upper legs 110 that bond with the lower legs 108 of the rib 106. The upper legs 110 may extend to a distal end 120 of the collapsible portion. The upper legs 110 and the lower legs 108 may define one or more relief notches 112. The relief notches 112 may be configured to allow the upper legs 110 to collapse towards the lower legs 108. In one or more embodiments, the collapsible portion may be formed a thermoplastic elastomer (TPE) or other suitable material. The thermoplastic elastomer provides an elastic material that is configured to collapse and form a seal between an evaporator and the rib.

In one or more embodiments, the lower legs 108 and at least a portion of the rib 106 may be comprised of the more elastic material than the remaining portion of the rib 106. For example, a bottom portion of the rib 106 may be comprised of polypropylene and an upper portion of the rib and the lower legs 108 may be comprised of an elastomeric material such as thermoplastic elastomer (TPE).

In one or more embodiments, the term bond refers to a molecular bond often formed by a two-shot molding process. A two-shot molding process may include injecting a first material, e.g., the rib 106 and subsequently injecting a second material, e.g., the collapsible portion as the first material cools. This process may cause the molecules of the first and second materials to bond to one another thereby avoiding the need for an adhesive or other suitable connection means.

As another example, the term bond may refer to a mechanical connection, or chemical connection, or both, formed by an over-molding process. An over-molding process may include placing a pre-molded insert formed of a first material e.g., the lower-blower housing 102 and the rib 106 into a mold and shooting or injecting a second material onto or around a portion of the pre-molded insert to form the desired configuration e.g., the collapsible portion. An over-molding process may differ from a two-shot or multiple shot injection molding process, in that the substrate or first material may have cooled and hardened before the second material is injected into the die.

In yet another example, the bond may be a purely mechanical bond, such as an interference fit condition or force fit condition. Another example of a mechanical bond may include one or more surfaces of the rib and one or more surface of the collapsible portion having engagement or retention features that are configured to engage with one another. The percentages of interfacing surfaces that contact each other is in the range of 50% to 100%.

In one or more embodiments, the rib 106 may be comprised of a material that is different than the base portion 104 of the lower blower housing 102. For example, the base portion 104 of the lower blower housing 102 may be formed of acrylonitrile butadiene styrene (ABS) or other suitable material and the rib may be comprised of polypropylene.

As shown in the table below, the thermoplastic elastomer is a softer material than the polypropylene material and the ABS material. The term hardness may refer to a measure of resistance of a material to indentation. Shore Hardness scales are used to measure hardness of different materials. Shore A Hardness Scale measures the hardness of flexible mold rubbers that range in hardness from very soft and flexible, to medium and somewhat flexible, or hard with almost no flexibility at all. Semi-rigid plastics can also be measured on the high end of the Shore A Scale. The Shore D Hardness Scale measures the hardness of hard rubbers, semi-rigid plastics and hard plastics.

TABLE 1

Comparison of mechanical properties.

| Material | Thermoplastic Elastomer | Polypropylene | Acrylonitrile butadiene styrene (ABS) |
| --- | --- | --- | --- |
| Ultimate Tensile Strength (MPa) | 14.5 | 40 | 110 |
| Young's Modulus (MPa) | 3.0-120 | 1300-1800 | 2300-2600 |
| % Elongation | 900 | 100 | 40 |
| Durometer (Shore) | 53A | 95A | 100D |

Figure 6:
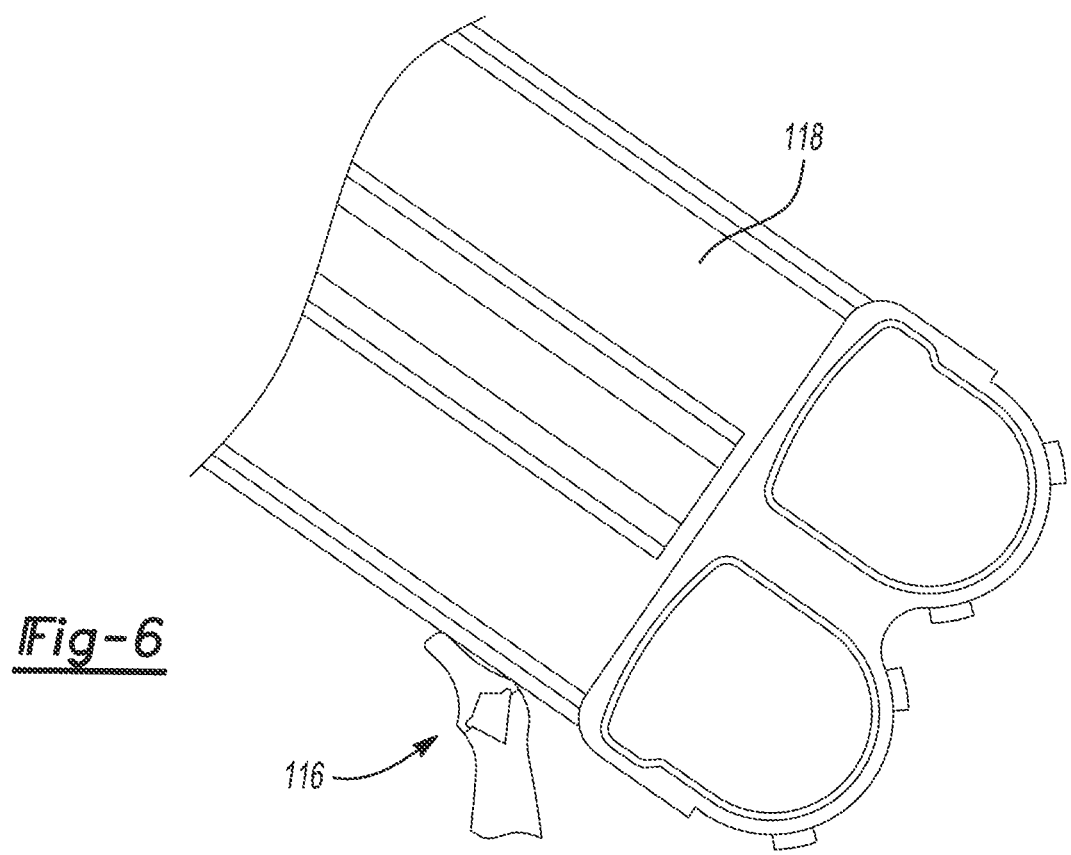
FIG. 6 is a detailed view of the exemplary lower blower housing and the integrated seal in the installed position.

FIG. 6 illustrates a plan view of the evaporator 18 disposed on the integrated seal 116. Here, the collapsible portion is in the collapsed position so that a water proof seal is formed between the evaporator and the integrated seal 116.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An HVAC assembly for a vehicle comprising:
   a blower housing including,
      a base portion including a rib outwardly extending therefrom, wherein the base portion and the rib are formed of a first material having a first elongation to yield,
      wherein the rib includes a proximal end, connected to the base portion, a medial portion extending from the base portion, and a distal end, extending from the medial portion, and wherein the distal end includes a first pair of legs that extend from the medial portion, and
      a collapsible portion including a second pair of legs formed of a second material and fixed to the rib by a bond between the first and second materials, wherein the second material has a second elongation to yield that is greater than the first elongation to yield of the first material and is configured to collapse when a force is applied to the collapsible portion.

2. The HVAC assembly of claim 1, wherein the first pair of legs are arranged to have a V-shape in cross section.

3. The HVAC assembly of claim 2, wherein a first pair of legs and the second pair of legs define a relief notch.

4. The HVAC assembly of claim 2, wherein the second pair of legs are arranged to have a V-shape in cross section and wherein an open end of the first pair of legs opposes an open end of the second pair of legs.

5. The HVAC assembly of claim 1, wherein the first material is polypropylene.

6. The HVAC assembly of claim 1, wherein the second material is an elastomeric material.

7. An HVAC system comprising:
   an evaporator; and
   a lower blower assembly including a base portion and provided with a seal, wherein the seal includes,
      a rib, comprised of a first material, outwardly extending from the base portion to a distal end, wherein the distal end includes a first pair of legs having a V-shape in cross section,
      an elastic portion, comprised of a second material, including a second pair of legs arranged to have a V-shape in cross section and connected to the distal end by a bond, wherein the collapsible portion is configured to collapse when the evaporator is laid on the seal.

8. The HVAC system of claim 7, wherein the first material has a first elasticity and the second material has a second elasticity and wherein the second elasticity of the second material is greater than the first elasticity.

9. The HVAC system of claim 8, wherein the second elasticity of the second material is at least five times greater than the first elasticity of the first material.

10. The HVAC system of claim 8, wherein the first material has a first hardness and the second material has a second hardness that is less than the first hardness.

11. The HVAC system of claim 8, wherein the lower base portion and the seal are made by injection molding.

12. The HVAC system of claim 8, wherein the first material includes polypropylene.

13. The HVAC system of claim 8, wherein the second material is a thermal plastic elastomer.

14. The HVAC system of claim 7, wherein the bond is a molecular bond formed by a two-shot injection molding process.

15. The HVAC system of claim 7, wherein the base portion is formed of a third material, different from the first material and the second material.

16. The HVAC system of claim 15, wherein the third material has a third elasticity that is less than the second elasticity of the second material.

17. The HVAC system of claim 7, wherein an open end of the first pair of legs opposes an open end of the second pair of legs.

18. A method of producing an HVAC assembly comprising:
   injecting a first material into a mold defining a cavity to form a lower blower housing that includes a base portion, a sidewall, and a rib each extending therefrom, wherein the rib includes a proximal end, connected to the base portion, a medial portion extending from the base portion, and a distal end, extending from the medial portion, and wherein the distal end includes a first pair of legs that extend from the medial portion; and
   injecting a second material into the mold to form a collapsible seal including a second pair of legs arranged to have a V-shape in cross section and bonded to a distal end of the rib.

19. The method of claim 18, wherein injecting the second material occurs after injecting the first material.

20. The method of claim 19, further comprising placing an evaporator on the collapsible seal so that the collapsible seal substantially collapses.

* * * * *